United States Patent
Shin et al.

(10) Patent No.: US 8,170,633 B2
(45) Date of Patent: May 1, 2012

(54) MOBILE TERMINAL CONFIGURED TO BE MOUNTED ON A USER'S WRIST OR FOREARM

(75) Inventors: Man-Soo Shin, Seoul (KR); Won-Seok Joo, Seoul (KR); Kyung-Tae Yang, Seoul (KR); Young-Min Lee, Seoul (KR); Jong-Hun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 726 days.

(21) Appl. No.: 12/264,770

(22) Filed: Nov. 4, 2008

(65) Prior Publication Data

US 2009/0143117 A1 Jun. 4, 2009

(30) Foreign Application Priority Data

| Nov. 5, 2007 | (KR) | 10-2007-0112352 |
| Dec. 13, 2007 | (KR) | 10-2007-0130425 |
| Dec. 20, 2007 | (KR) | 10-2007-0134516 |
| Dec. 20, 2007 | (KR) | 10-2007-0134518 |

(51) Int. Cl.
*H04M 1/00* (2006.01)
(52) U.S. Cl. .................... 455/575.6; 455/558
(58) Field of Classification Search ............... 455/575.6
See application file for complete search history.

(56) References Cited

U.S. PATENT DOCUMENTS

| 6,158,884 A * | 12/2000 | Lebby et al. ............... 368/282 |
| 6,212,414 B1 | 4/2001 | Alameh et al. |
| 6,224,254 B1 | 5/2001 | Hayek et al. |
| 6,430,110 B2 | 8/2002 | Baroche et al. |
| 6,535,461 B1 | 3/2003 | Karhu |
| 7,818,036 B2 * | 10/2010 | Lair et al. ............... 455/575.2 |
| 2002/0101788 A1 | 8/2002 | Petsch |
| 2004/0046658 A1 | 3/2004 | Turner et al. |
| 2005/0014534 A1 * | 1/2005 | Hareng et al. ............ 455/567 |
| 2005/0020302 A1 | 1/2005 | Ikeda et al. |
| 2008/0026791 A1 | 1/2008 | Kim et al. |

FOREIGN PATENT DOCUMENTS

| CN | 1140342 A | 1/1997 |
| CN | 2446633 Y | 9/2001 |
| EP | 1056260 A2 | 11/2000 |
| GB | 2355881 A | 5/2001 |

* cited by examiner

*Primary Examiner* — Lincoln Donovan
*Assistant Examiner* — John Poos
(74) *Attorney, Agent, or Firm* — Birch, Stewart, Kolasch & Birch, LLP

(57) ABSTRACT

A mobile terminal includes: a terminal body having a display unit; a band connected with both ends of the terminal body; and an antenna radiator installed in the band.

14 Claims, 15 Drawing Sheets

MOBILE TERMINAL CONFIGURED TO BE MOUNTED ON A USER'S WRIST OR FOREARM

CROSS REFERENCE TO RELATED APPLICATIONS

This application claims the benefit of Korean Patent Application No. 10-2007-112352, filed on Nov. 5, 2007, Korean Application No. 10-2007-130425, filed on Dec. 13, 2007, Korean Application No. 10-2007-134516, filed on Dec. 20, 2007, and Korean Application No. 10-2007-134518, filed on Dec. 20, 2007, all of which are herein incorporated by reference in their entireties.

BACKGROUND OF THE INVENTION

1. Field of Invention

The present invention is directed to a mobile communication terminal that can be worn on a user's arm or wrist.

2. Discussion of the Related Art

There exists conventional mobile terminals that can be hand carried and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, numerous attempts are being made in terms of hardware or software. For example, a user interface is provided to allow users to easily and conveniently search for and select one or more functions.

Also, as users consider their mobile terminal to be a personal portable device, various designs may be applied for mobile terminals to express personality of users.

Conventional mobile terminals are sized to be held in hand, so users carry around their mobile terminal in a hand-held manner or carry around their mobile terminal in pockets, purses or belt clips. However, conventional handheld mobile terminals can easily be lost or inadvertently dropped while being carried around.

Mobile terminals that can be put on like clothes, ornaments or a wristwatch have been proposed. However, for such a concept to be realized, it is required that such a device have good usability without degrading its external appearance.

SUMMARY OF THE INVENTION

The present inventors recognized certain drawbacks of the related art, as explained above. Upon such recognition, the following concepts and features have been conceived.

A mobile terminal, that can be put on the human body such as the wrists or arms, has a relatively smaller size and implements good usability is provided herein.

Such a mobile terminal includes a terminal body having a display unit; a band connected with both ends of the terminal body; and a manipulation unit disposed on the terminal body and moving in multiple directions based on a rotational axis. With this configuration, the mobile terminal having a small limited size can facilitate an inputting operation and have an improved external appearance.

The manipulation unit may include a wheel installed to be rotatable based on a rotational shaft parallel to a widthwise direction of the terminal body. In this case, a pair of push keys may be formed to be pressed at both sides of the wheel in order to perform an inputting operation through simple and repeated manipulation, shunning a complicated keypad.

The display unit may be configured to output multiple numbers or characters that can be inputtable according to a forward rotation or reverse rotation of the wheel and a pressing operation of the pair of push keys.

The terminal body may include a first mounting part, and second and third mounting parts disposed at both ends of the first mounting part. In this case, the display unit may be disposed on the first mounting part, the manipulating part may be disposed on the second mounting part, and a speaker may be disposed on the third mounting part. The second and third mounting parts may be formed to be symmetrical to each other in a slanting manner based on the first mounting part to thus facilitate inputting and outputting.

The terminal body may include: a first frame having a contact face that comes in contact with a human body and connection portions formed at both ends thereof for being connected with the band; and second and third frames combined with an upper portion of the first frame and forming the second and third mounting parts.

The connection portions of the first frame may contact with both end portions of the band and be fastened by screws.

The mobile terminal may further include a first sealing portion that seals a gap between the terminal body and the band. The first sealing portion may include a skirt portion formed at the terminal body and covers an edge of an end portion of the band such that it overlaps with the edge of the end portion of the band in a lengthwise direction. In this case, the edge of the band may be chamfered and a contact portion of the skirt portion with the band may be sloped to surface-contact with the edge of the band.

Through holes, through which the manipulation unit is exposed, may be formed at the second and third frames, and a second sealing portion may be additionally included at an inner side of the through hole to hermetically seal a gap between the through holes and the manipulation unit. The second sealing portion may be attached along edges of the manipulation unit and may be made of urethane or a silicon resin that may be pressed by the second and third frames.

A third sealing portion may be additionally formed to hermetically seal a gap between the first and second frames. In this case, the third sealing portion may be made of a urethane resin coated along the gap between the first and second frames.

A receiving hole for receiving a card may be formed on a rear surface of the terminal body and a cover may be detachably mounted on the receiving hole. A charging terminal may be disposed at one side of the cover to charge a battery.

A receiving hole for receiving a card may be formed on the rear surface of the terminal body, and a cover may be mounted on the receiving hole such that it can be horizontally rotatable. In this case, an insertion hole may be formed by cutting one portion of an edge of the cover to insert the card in a first rotational angle. In this case, a charging terminal may be additionally disposed to charge the battery in the receiving hole, and may be exposed through the insertion hole when the cover is at a second rotational angle.

The receiving hole may include a receptacle formed to allow the card or a plug to be connected therewith. For example, the card may be a UIM/SIM card, and the plug may have the shape of the UIM/SIM card. The plug may be connected with a cable for an input or output.

The receptacle may additionally include a pair of detector pins for detecting whether or not the plug is inserted. A conductive connection pad may be provided on a surface of the plug so that when the plug is inserted, the detector pins can be short-circuited.

The terminal body may include a controller to control to change to a plug connection mode when the UIM/SIM card is not mounted or the detector pins are short-circuited.

DETAILED DESCRIPTION

The mobile terminal according to the exemplary embodiments of the present invention will now be described in detail with reference to the accompanying drawings.

Figure 1:
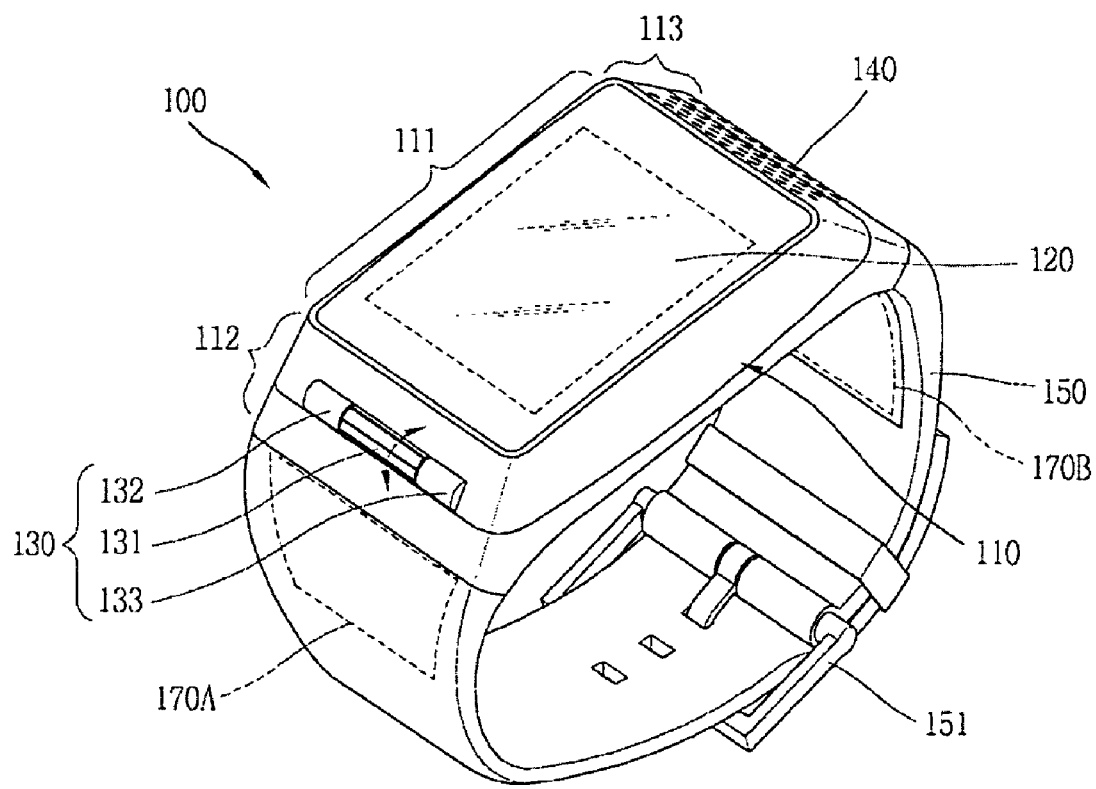
FIG. 1 is a front perspective view of a mobile terminal according to an exemplary embodiment of the present invention.

As shown in FIG. 1, the mobile terminal 100 according to an exemplary embodiment of the present invention includes a terminal body 110 with a display unit disposed on its outer surface to display visual information. Opposing ends of the terminal body 110 are connected with a band 150 (also shown as items 250, 350, 450 and 650 in FIGS. 2A-2B, 3A-C, 4A-4B and 7, respectively) so that the mobile terminal can be worn on the users wrist or arm. The terminal body 110 may include a communication module allowing communication with a base station, a server device or an external device within a communication network.

The outer surface of the terminal body 110 includes a first mounting part 111 on which a display unit 120 is disposed, a second mounting part 112 connected with a lower portion of the first mounting part 111 and connected with one end of the band 150, and a third mounting part 113 connected with an upper portion of the first mounting part 111 and connected with the other end of the band 150. The first to third mounting parts 111 to 113 may include units that handle an input and output functions of the mobile terminal 100.

The second and third mounting parts 112 and 113 have substantially the same height as the external surface of the band 150, thus preventing a sharp change in the shape between the band 150 and the second mounting part 112 and between the band 150 and the third part 113.

Figure 8:
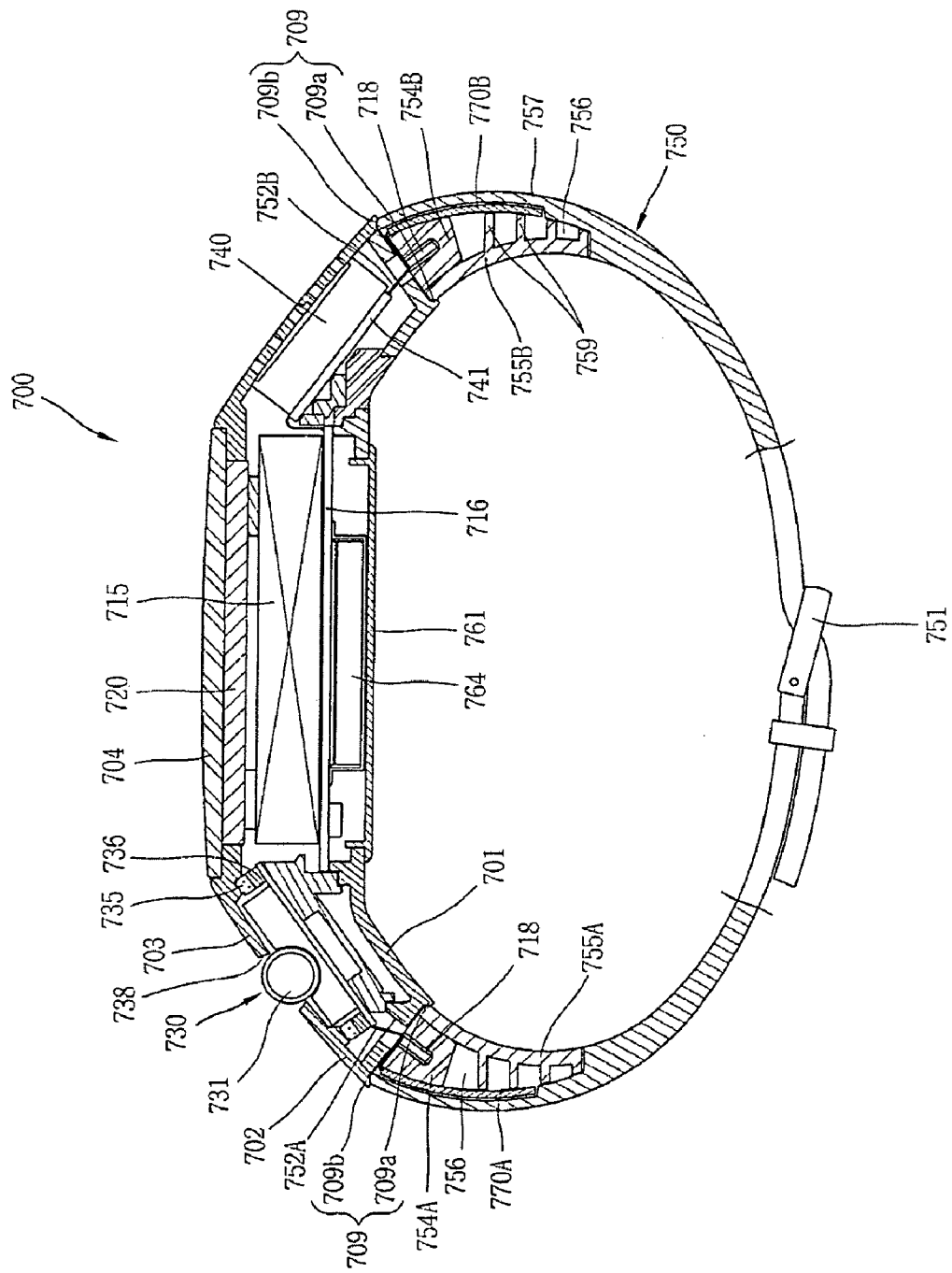
FIG. 8 is a sectional view of a mobile terminal according to an exemplary embodiment of the present invention.

The band 150 may include antenna radiators 170A and 170B for wirelessly connecting the terminal body 110 to a base station or to an external independent device, or to a supplementary device, such as an ear set. Such disposition of the antenna radiators 170A and 170B (also shown as items 270A/270B and 470A/470B in FIGS. 2A-2B and 4A-4B, respectively) can effectively solve the problem of degradation of receive sensitivity or degradation of the external appearance that may arise if the antenna radiators would be installed within the terminal body 110 which is small and has a limited size. FIG. 8 shows that antenna radiators 770A and 770B are installed in the band 750.

The band 150 may include a fastener 151 to allow the terminal body 110 to be attached to the user's wrist or arm. The fastener 151 may be implemented as a buckle, a snap-fit hook, or Velcro™, or the like, and may have an elastic portion or may be made of elastic material. The fastener 151 as shown in FIG. 1 is the buckle type fastener. The band 150 may be made of leather, rubber and plastic or may have a multi-layer form by staking several layers. Alternatively, the fastener 151 may be eliminated and the band 150 can be formed as a single stretchable member.

A manipulation portion 130 (also shown as items 230, 330, 430 and 630 in FIGS. 2A-2B, 3A-C, 4A-4B and 7, respectively) is located at the second mounting part 112 and configured to be movable in multiple directions based on a rotational axis. A speaker 140 for outputting audio information is located at the third mounting part 113. The manipulating portion 130 and the speaker 140 provide a convenient input/output environment for the user. As shown in FIG. 1, the second and third mounting parts 112 and 113 are formed to be sloped in a symmetrical form with respect to the first mounting part 111. Such configuration and disposition can prevent an increase in protruded portions that might otherwise interrupt the external appearance when the mobile terminal is worn. By providing the sloped configuration, the manipulation of the manipulation unit 130 by the user can be enhanced. Furthermore, the sloped-shape of the second and third mounting parts 112 and 113 may allow a user to see the display unit 120 easily without hiding the display unit by the user's fingers.

The manipulation unit 130 may include a wheel 131 (also shown as items 231, 631 and 731 in FIGS. 2A-2B, 7 and 8, respectively) installed to be rotatable about a rotational shaft oriented such that the rotational axis of the rotational shaft is parallel to a widthwise direction of the band 150. The disposition of the wheel 131 is not so limited, and the rotational axis may be parallel to a lengthwise direction of the band 150. Wheel 131 may also be pushed in the center, or have ends arranged as push buttons (i.e., with a rocking motion).

A pair of push keys 132 and 133 (also shown as items 232/233 and 632/633 in FIGS. 2A-2B and 7, respectively) may be disposed in a pressing manner at both sides of the wheel 131. Also, the wheel 131 may be formed to be inputtable by a pressing operation. A key value according to a pressing operation of the wheel 131 may be set to signify 'OK' or 'enter'.

As shown in FIG. 1, the wheel 131 may be disposed such that a portion thereof is located in the second mounting part 112 of the terminal body 110. Such configuration and disposition of the wheel 131 and the push keys 132 and 133 allow the mobile terminal 100 to be compact while providing a sufficient length for contacting of user's finger to rotate the wheel 131. A pressing prevent unit (not shown) or configuration may be included at both ends of the push keys 132 and 133 to prevent an erroneous input caused by an unintentional pressing. For example, an erroneous input pressing preventing unit may be a protrusion (protruded configuration) formed with the same height as the push keys 132 and 133.

The wheel 131 may be formed to have a cylindrical shape with regular valleys in a circumferential direction so as to be moved, upon being contacted by the user's finger, in a forward direction or backward direction to move a pointer or a cursor or control various adjustable amounts or intensities, for example, the sound volume or brightness of a screen image, etc., in various modes. The wheel may be operated so as to scroll through a displayed list.

The display unit 120 may output multiple numbers or characters that can be selectable by the forward or reverse rotation of the wheel 131 and the pressing operation of the pair of push keys 132 and 133. Namely, when numbers or characters are arranged on the display unit 120, the user may move the cursor or the pointer by the means of the wheel 131 and the push keys 132 and 133 to select corresponding numbers or characters to dial or edit a message to be sent. The display unit 120 may output a current time or date, severer limited items, or an image in a standby mode to save power.

The forward rotation and reverse rotation of the wheel 131 and the push keys 132 and 133 may indicate four-directional instructions to the cursor or the pointer. When an item is selected according to combination of the rotation of the wheel 131 and clicking of the push keys 132 and 133, the cursor or the pointer is moved to the item and then the wheel 131 is pressed to execute the corresponding item or function.

Figure 12A:
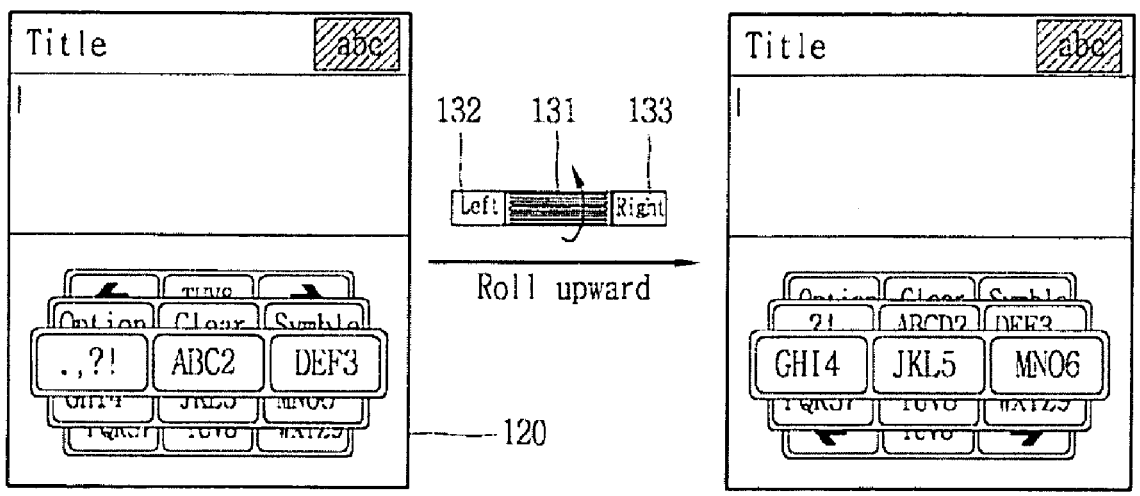
FIGS. 12A to 12D are diagrams showing effects of manipulating the manipulation unit of the mobile terminal according to an exemplary embodiment of the present invention and the corresponding action shown on the display unit.
Figure 12A:
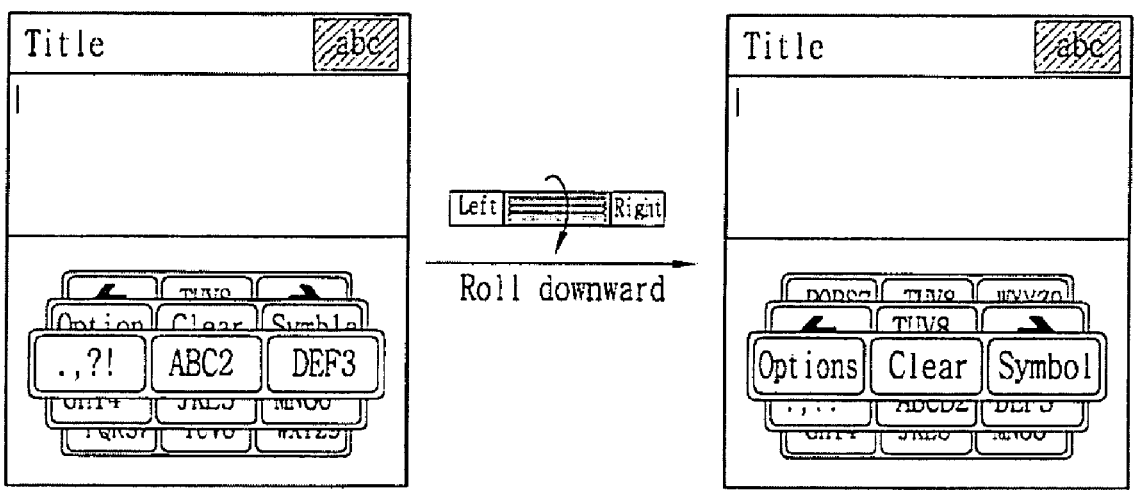

For example, FIGS. 12A to 12D show data being inputted and displayed by the display unit 120 through manipulation of the input unit 130. For example, the display 120 may include several sub-sections (windows or frames). One of the sub-sections is for displaying text or numbers inputted, and the other of the sub-sections is for displaying (rollable) key groups. Five (rollable) key groups are displayed in the exemplary embodiment. When the wheel 131 is rolled upward or downward, the key groups are moved upward or downward just like rolling upward or downward (FIG. 12A). The key group selected for inputting may be centrally positioned and have an enlarged shaped. Each key group has three key blocks, a left key block, a center key block, and a right key block. The left key block corresponds to left button 132, the central key block corresponds to the wheel 131, and the right key block corresponds to right button 133. Each key block may have several key values, such as letters, numerals, symbols, and the like.

Figure 12B:
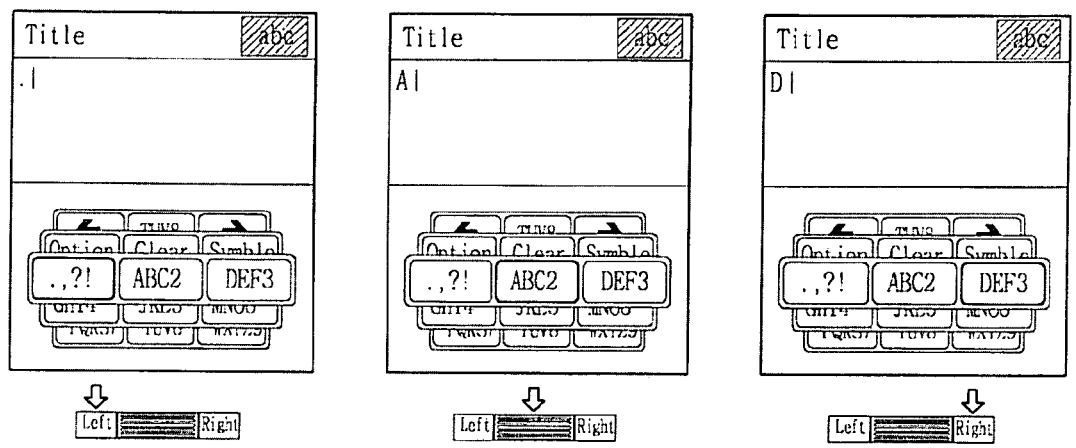
Figure 12C:
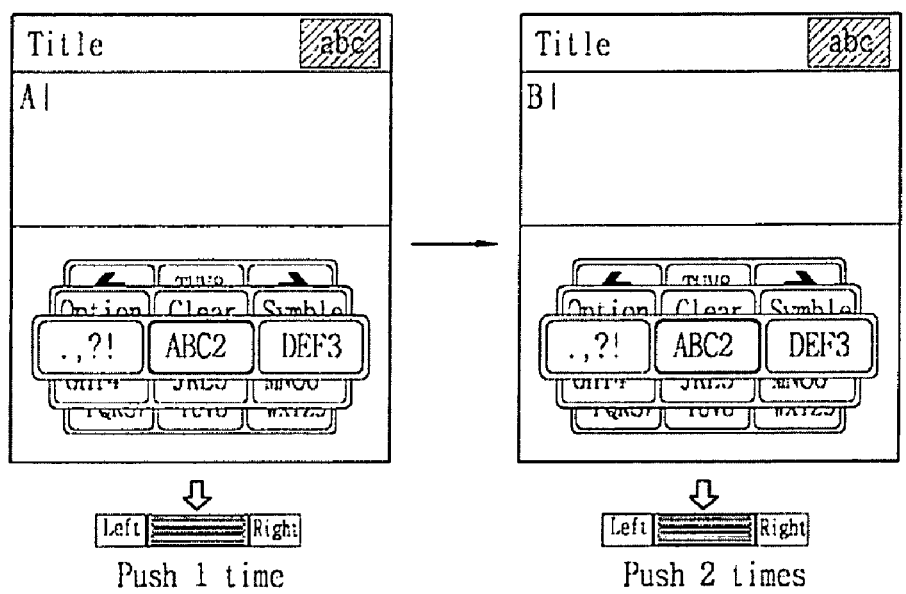
Figure 12C:
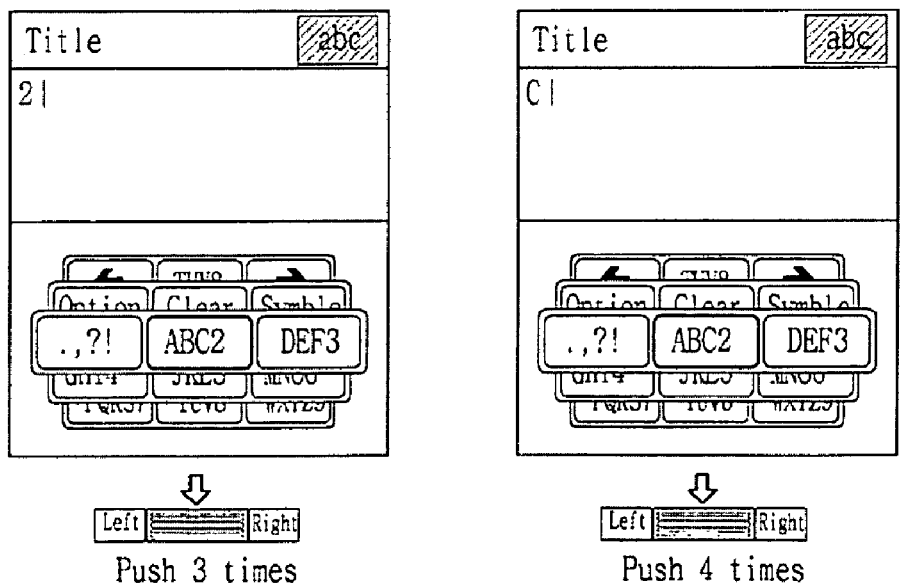
Figure 12D:
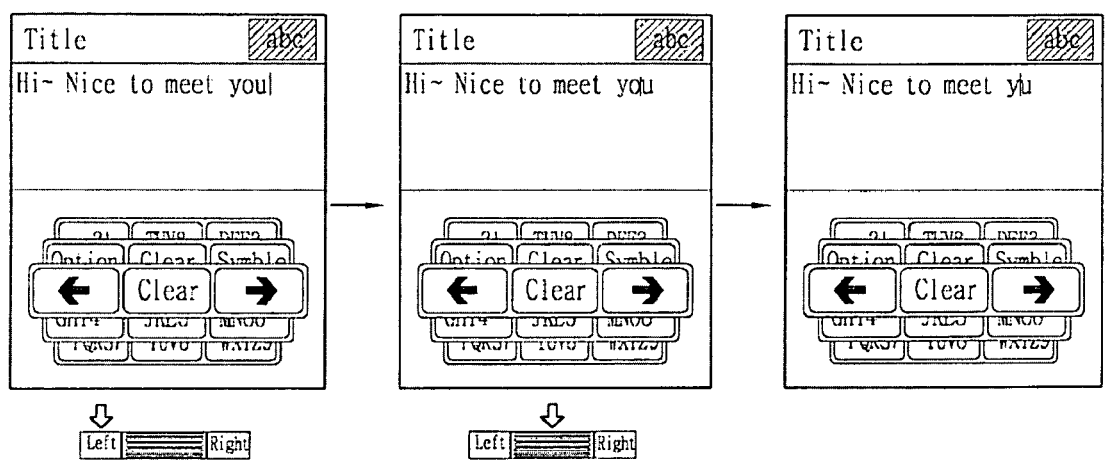

As shown in FIG. 12B, when the left key button is pressed once, a "." is inputted, when the wheel 131 is pressed once, am "A" is inputted, and when the right key button 133 is pressed once, a "D" is inputted. Similarly, as shown in FIG. 12C, repeatedly pushing one of the left key button 132, the wheel 131, and the right key button 133, the number of character displayed can change based on the characters and numbers associated with the key group. In addition to inputting data, as shown in FIG. 12D, the input unit can be manipulated to move the cursor within the upper window and to perform other functions, such as "Clear." The input unit 130 is not limited to just the foregoing operations but many other operations of the mobile terminal can be controlled.

Figure 2A:
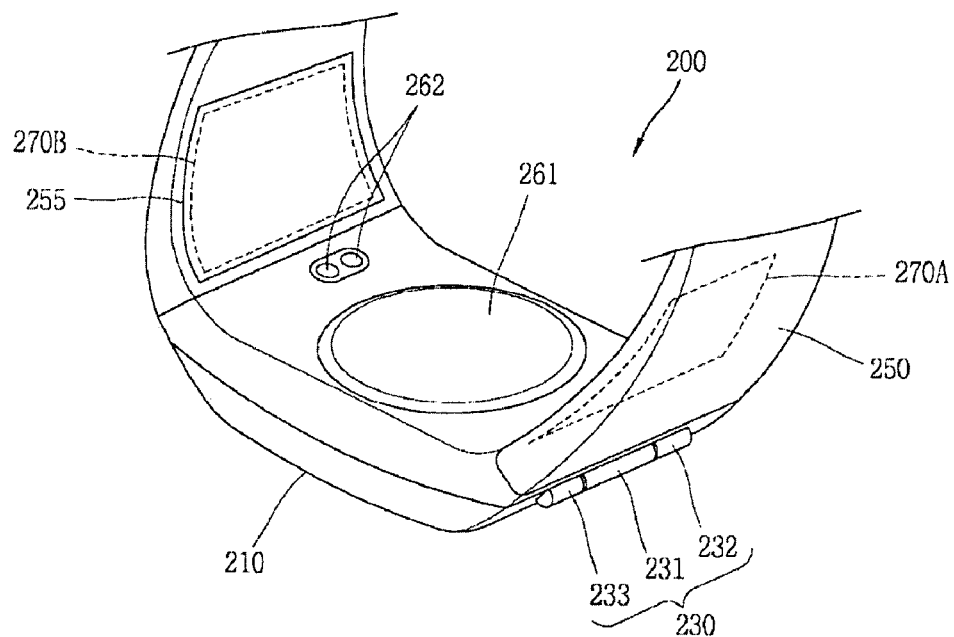
FIG. 2A is a rear perspective view of a mobile terminal according to an exemplary embodiment of the present invention.
Figure 2B:
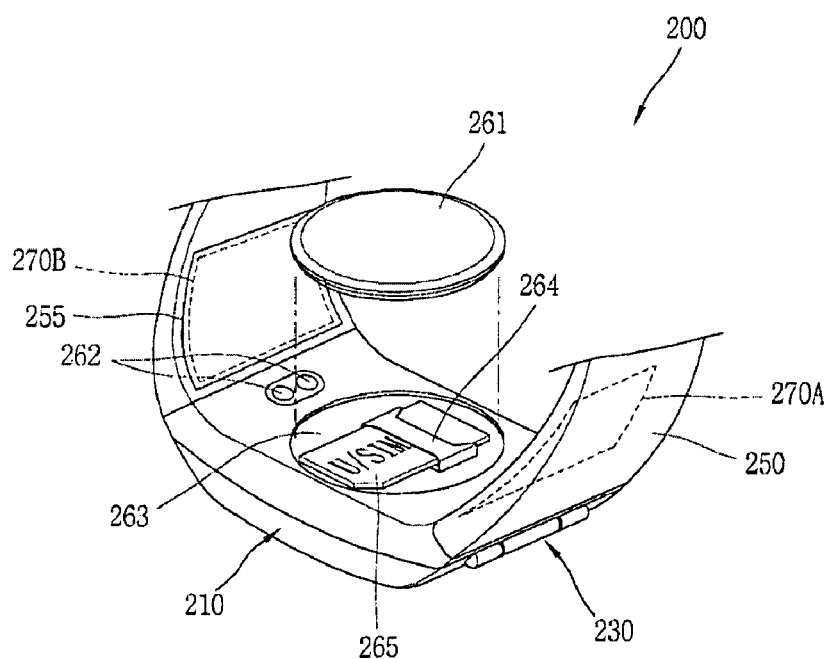
FIG. 2B is a rear perspective view showing a state that a cover of the mobile terminal in FIG. 2A is separated.

FIG. 2A is a rear perspective view of a mobile terminal according to an exemplary embodiment of the present invention, and FIG. 2B is a rear perspective view showing a state that a cover of the mobile terminal in FIG. 2A is separated. In the present embodiment, a front configuration of the mobile terminal 200 may have similar characteristics to those of the mobile terminal 100 shown in FIG. 1, and similar reference numerals are given to the corresponding elements.

As shown in FIGS. 2A and 2B, a cover 261 (also shown as items 461 and 761 in FIGS. 4A-4B and 8, respectively) for opening and closing an internal space of the terminal body 210 (also shown as item 410 in FIGS. 4A-4B) is provided on a rear surface of the terminal body 210. Also shown in antenna radiator 270B in well 255.

A receiving hole 263 (also shown as item 463 in FIGS. 4A-4B) for receiving a User Identity Module/Subscriber Identity Module card (UIM/SIM) 265 is formed on the rear surface of the terminal body 210. The cover 261 is detachably attached to the receiving hole 263. The cover 261 may be secured by a fastening component (not shown) such as a screw. Accordingly, the UIM/SIM card 265 may be sufficiently protected from the exterior and protected against infiltration of moisture.

Figure 4A:
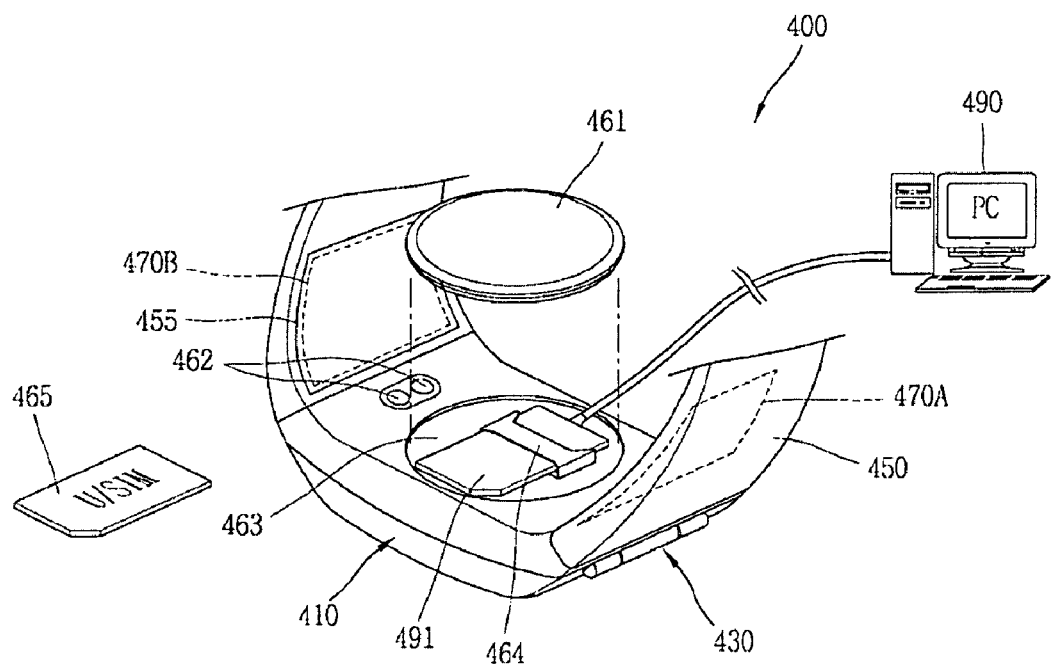
FIG. 4A is a rear perspective view of a mobile terminal showing a state that a plug, instead of a UIM/SIM card, is inserted in a receptacle according to an exemplary embodiment of the present invention.
Figure 4B:
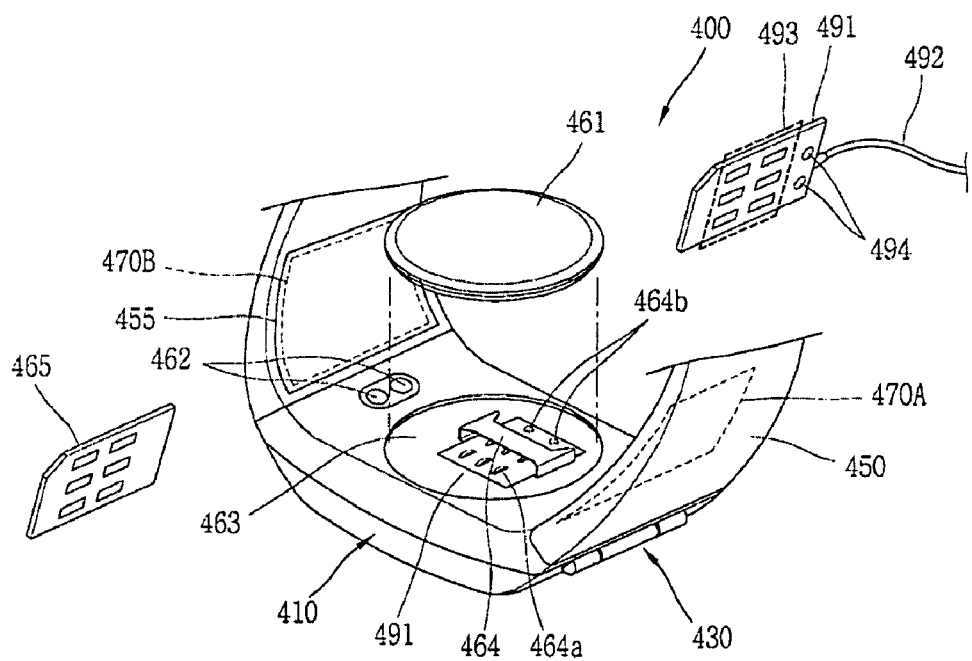
FIG. 4B is a rear perspective view of the mobile terminal showing the receptacle and a connection terminal of the UIM/SIM card and a plug connected with the receptacle in FIG. 4A.

The UIM/SIM card 265 may be inserted in a receptacle 264 (also shown as item 764 in FIG. 8) so as to be connected with the terminal body 210. In addition to the UIM/SIM card 265, a memory card can be also connected with the receptacle 264. The receptacle 264 may be formed such that other various types of cards or a plug is inserted. FIGS. 4A and 4B shows such configurations in greater detail.

As shown in FIGS. 2A and 2B. A charging terminal 262 (also shown as item 462 in FIGS. 4A-4B) for charging a re-chargeable battery (not shown) is disposed at one side of the cover 261. The charging terminal 262 may be connected with an external charging device for charging the mobile terminal 100 or a plug unit to supply power to the battery disposed in the mobile terminal. Such disposition of the charging terminal 262 may advantageously minimize a complicated shape or the exposure of the charging terminal that may be seen from outside the mobile terminal 200 while in a usage state. The charging terminal 262 may be connected with a charger having a configuration that allows the terminal body 210 to be mounted thereon and receive external power. A pair of band covers 255 is provided to cover the rear surface of the band 250 to protect the antenna radiators 270A and 270B located in the band 250. The arrangement of the band covers will be described in greater detail below.

Figure 3A:
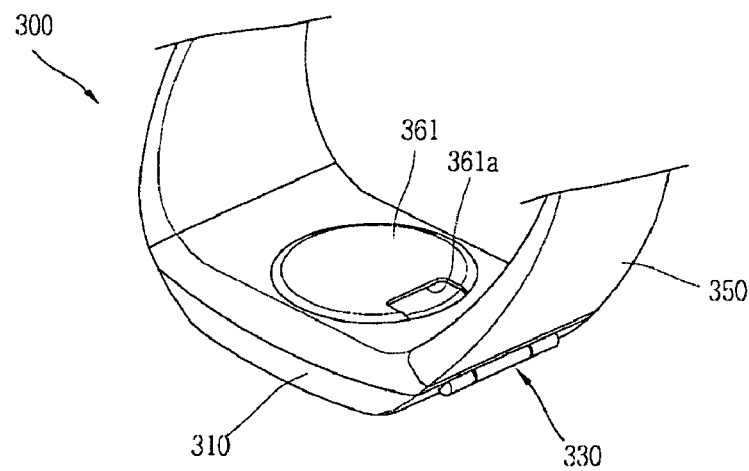
FIG. 3A is a rear perspective view of a mobile terminal according to an exemplary embodiment of the present invention.
Figure 3B:
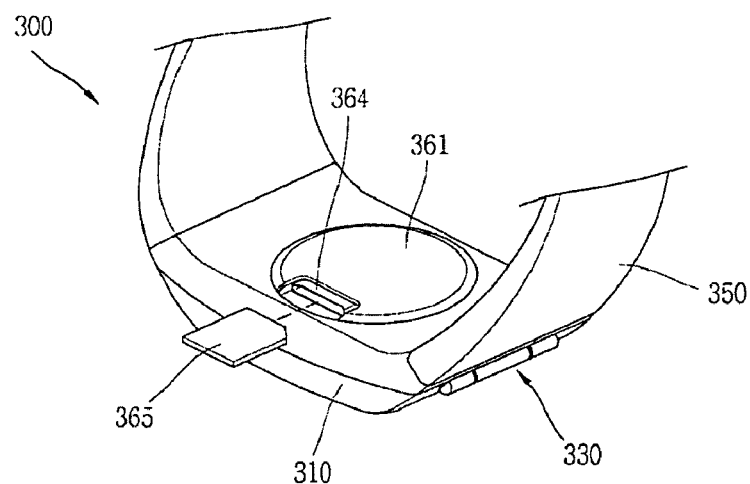
FIG. 3B is a rear perspective view of the mobile terminal showing a state that the cover of the mobile terminal in FIG. 3A is rotated by 90□.
Figure 3C:
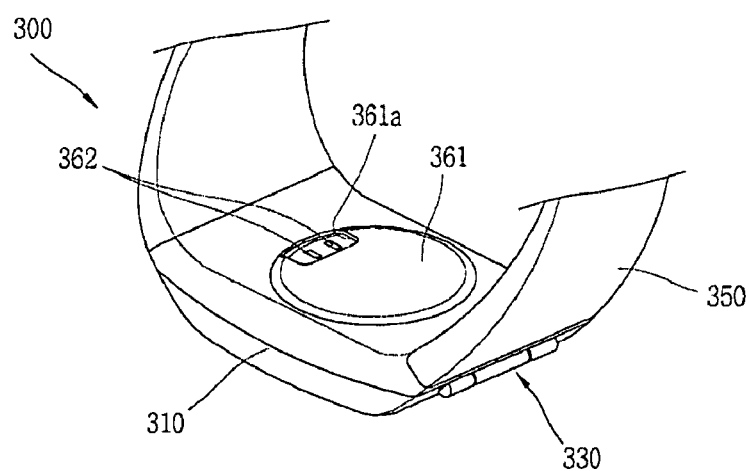
FIG. 3C is a rear perspective view of the mobile terminal showing a state that the cover of the mobile terminal in FIG. 3B is rotated further by 90°.

FIG. 3A is a rear perspective view of a mobile terminal according to an exemplary embodiment of the present invention, FIG. 3B is a rear perspective view of the mobile terminal showing a state that the cover of the mobile terminal in FIG. 3A is rotated by 90°, and FIG. 3C is a rear perspective view of the mobile terminal showing a state that the cover of the mobile terminal in FIG. 3B is rotated further by 90°. A front configuration of a mobile terminal 300 according to the present embodiment may have similar characteristics to those of the mobile terminal 100 in FIG. 1 as described above, and similar reference numerals are given to the corresponding elements.

In the present exemplary embodiment, a cover 361 may be formed in a disk type on a lower surface of a mobile terminal 310 and combined to be horizontally rotatable to various positions. In FIGS. 3A to 3C, the cover 361 is combined to be horizontally rotatable based on its center.

In this exemplary embodiment of the present invention, a charging terminal 362 is disposed at an inner side of the cover 361, and a receptacle 364 and the charging terminal 362 may be selectively accessed according to a rotation angle of the cover 361. In particular, Namely, the cover 361 includes an insertion recess 361a through which a card 365 can be inserted into the receptacle 364 only at a first rotation angle. As shown in FIG. 3B, when the cover 361 is rotated by about 90°, the insertion recess 361a is also rotated together to allow the card 365 to be put into or put out of the receptacle 364.

When the cover 361 is rotated to a second rotation angle, charging terminals 362 are exposed. As shown in FIG. 3C, when the cover 361 is rotated by about 180°, the insertion recess 361 is positioned to expose the charging terminals 362. In this configuration, the mobile terminal 300 may be mounted, for example, on a charging cradle so that the charging cradles is connected to the charging terminals 362, so as to charge an internal battery.

Unlike the embodiments as shown in FIGS. 3A to 3C, the mobile terminal can be configured such that, in a state that the receptacle and the charging terminals are all covered (which can be called 'a closed configuration'), when the cover is rotated clockwise, the receptacle may be exposed, and when the cover is rotated counterclockwise, the charging terminals may be exposed. In this case, the first and second rotation angles are the opposite.

FIG. 4A is a rear perspective view of the mobile terminal showing a state that a plug, instead of a UIM/SIM card, is inserted in a receptacle according to an exemplary embodiment of the present invention, and FIG. 4B is a rear perspective view of the mobile terminal showing the receptacle and a connection terminal of the UIM/SIM card and a plug connected with the receptacle in FIG. 4A. A front view of a mobile terminal 400 according to the embodiment of the present invention may similar characteristics to those of the mobile terminal 100 in FIG. 1, and similar reference numerals are given to the corresponding elements.

In the present embodiment, two or more types of cards may be connected with a receptacle 464. In particular, as shown in FIG. 4A, as well as a UIM/SIM card 465, a plug 491 connected with an external computer 490 or a network may be also connected with the mobile terminal through the receptacle 464.

As shown in FIG. 4B, the receptacle 464 may have a socket or holder shape to which the UIM/SIM card 465 or the plug 491 may be insertedly connected, and include a terminal part 464a including multiple pins to which the UIM/SIM card 465 and the plug 491 can be connected.

The plug 491 has the same shape as the UIM/SIM card 465, having a unified external appearance, thereby obtaining a stable connection state with a terminal part 493 of the receptacle 464.

The plug 491 may be connected with a cable 492 for an input/output function. In particular, as shown in FIG. 4A, the plug 491 may be connected with an external computer 490 or a network to allow an input or output between the mobile terminal 400 and the external computer or the network. Accordingly, the receptacle 464 does not need to have an additional connection unit, e.g., a socket or a connector, for a connection with the external computer 490 or the network, and thus, the volume of the mobile terminal can be reduced and formation of a complicated external appearance can be minimized.

As shown in FIG. 4B, the receptacle 464 includes a pair of detector pins 464b for detecting whether or not the plug 491 is inserted. The detector pins 464b physically detect whether the plug 491 has been inserted, as opposed to the UIM/SIM card 465, to allow a signal transmission between the receptacle 464 and the plug 491. The detector pins 464b may be formed as elastic springs that can be pressed when the plug 491 is inserted to the receptacle 464.

Conductive connection pads 494 may be provided on a surface of the plug 491 to correspond to the detector pins 464b, in order to short the detector pins 464. Accordingly, when the plug 491 is inserted, the detector pins 464b are shorted by virtue of the connection pads 494, and data can be inputted or outputted through the plug 491 according to signal standards of the plug 491 in the receptacle 464 according to a corresponding signal. As a result, a single receptacle 464 can be provided that receives and detects whether the UIM/SIM card 465 or plug 491 is inserted therein.

Figure 5:
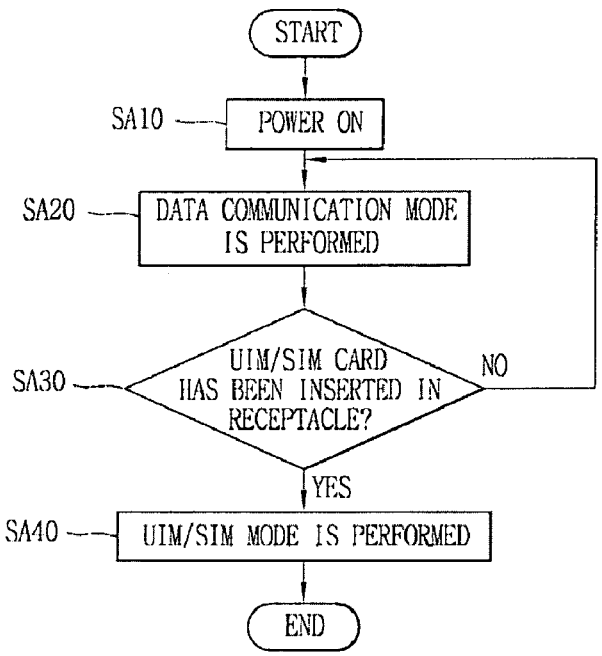
FIG. 5 is a flow chart illustrating a method for connecting the UIM/SIM card and the plug in a single receptacle according to an exemplary embodiment of the present invention.
Figure 6:
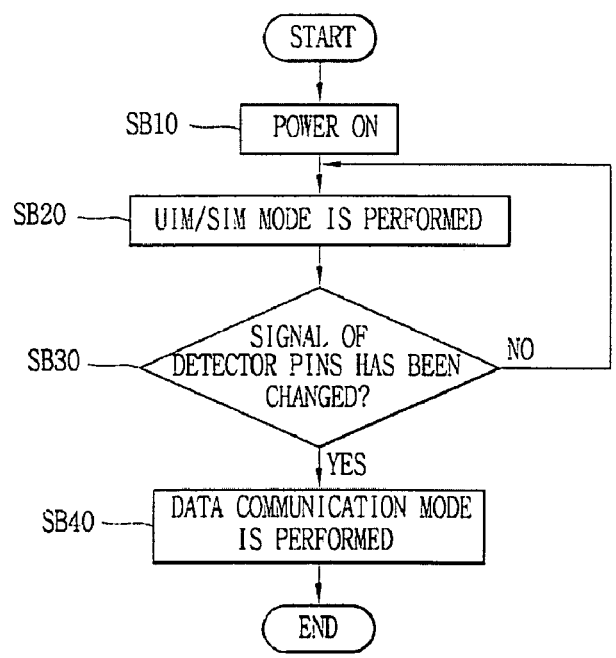
FIG. 6 is a flow chart illustrating a method for connecting the UIM/SIM card and the plug in a single receptacle according to the exemplary embodiment of the present invention.

FIGS. 5 and 6 are a flow chart illustrating the process of a method for connecting the UIM/SIM card and the plug in the single receptacle according to the exemplary embodiment of the present invention.

FIG. 5 shows a configuration where the card and the plug are commonly used in the receptacle and deleted by a software. First, when the mobile terminal is turned on (SA10), the mobile terminal is turned to a data communication mode in which the mobile terminal is connected with an external device and performs data communication (SA20). In this case, the plug may be inserted into the receptacle so that the mobile terminal can be connected with the external computer or a network to exchange data.

The mobile terminal checks whether or not the UIM/SIM card has been inserted in the receptacle (SA30). When the UIM/SIM card has been inserted in the receptacle, the mobile terminal receives a signal of the UIM/SIM card and is changed to a UIM/SIM mode (SA40).

When the UIM/SIM card is separated from the receptacle of the mobile terminal, the mobile terminal is changed to the data communication mode set as default (SA20).

Because the data communication mode is set as the default in the mobile terminal, a physical unit or element for recognizing the plug or other types of cards, besides, the UIM/SIM, does not need to be provided in the receptacle.

FIG. 6 shows a case where the card and the plug are commonly used in the receptacle by a physical method. When the mobile terminal is turned on (SB10), it is immediately changed to a UIM/SIM mode (SB20).

The mobile terminal checks whether a signal of the detector pins (464 in FIG. 4B) of the receptacle has been changed (SB30). If the plug is inserted into the receptacle, a change in the signal of the detector pins is transferred to a controller and the controller changes the mobile terminal to the data communication mode (SB40).

In this manner, the other types of cards or the plug, not the UIM/SIM card, can be recognized by the detector pins of the receptacle and data according to the inserted card or the plug can be inputted or outputted.

Figure 7:
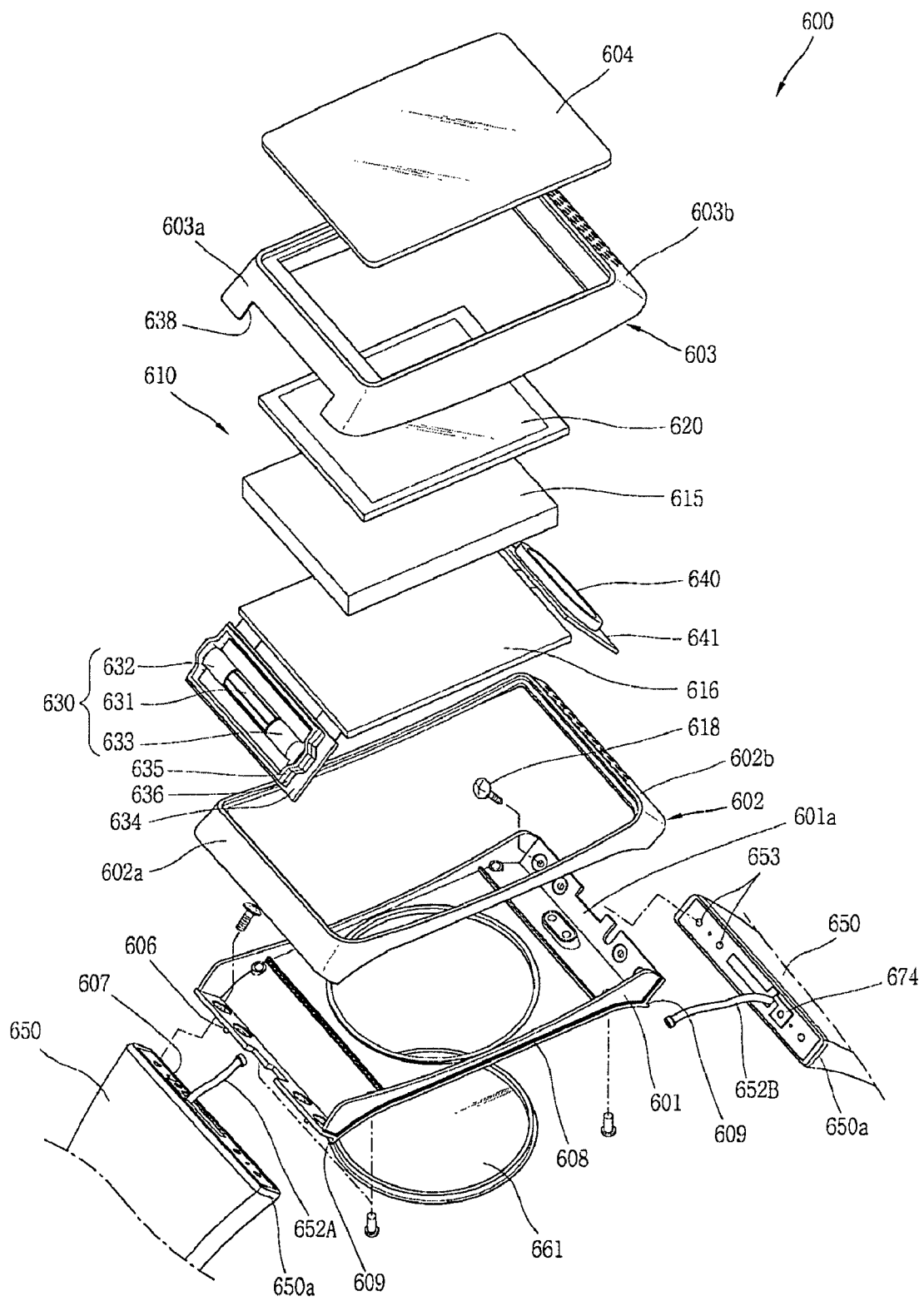
FIG. 7 is an exploded perspective view of a mobile terminal according to an exemplary embodiment of the present invention.

FIG. 7 is an exploded perspective view of a mobile terminal according to an exemplary embodiment of the present invention. A mobile terminal 600 may include the entirety or a portion of the characteristics of the mobile terminals described with reference to FIGS. 1 to 6 and similar reference numerals are given to the corresponding elements.

As shown in FIG. 7, a terminal body 610 includes multiple frames 601, 602 and 603 forming an external appearance of the mobile terminal body 610. Specifically, the terminal body 610 includes the first frame 601 having a contact face that contacts with the user's body and connection portions 601a to which a band 650 is connected, and the second and third frames 602 and 603 combined at an upper portion of the first frame 601 and having slope faces 602a, 602b, 603a, and 603b on which the second mounting part 112 (in FIG. 1) and the third mounting part 113 (in FIG. 1) are formed. In this configuration. the number of frames is not so limited. For example, the second and third frames 602 and 603 may be integrally formed as a single form, or additional frames can be provided.

The connection portions 601a of the first frame 601 may include sections that may contact with both end faces of the band 650 and are fastened by screws 618. Fastening holes 653 may be formed on both end faces of the band 650 to correspond to the screws 618. Such fixing method prevents the connection parts between the band 650 an the terminal body 610 from being moved relatively or deformed, obtaining stability of implementing performance of other components that may be mounted at the band 650 and improving an electrical connection state with the terminal body 610.

Stop protrusions 606 are formed on the connection portions 601a of the terminal body 610 to prevent the band 650 from being moved or shaken in the direction perpendicular to the lengthwise direction, and insertion holes 607 are formed at the band 650 to allow the stop protrusions 606 to be inserted therein.

Fastening by the screws 618 or the presence of the stop protrusions 606 and the insertion holes 607 can prevent the band 650 from being deformed or relative to the terminal body 610 moved in the vicinity of the connection portions 601a.

The terminal body 610 and the band 650 are electrically connected by transmission lines 652A and 6528 (also shown as items 752A and 752B in FIG. 8). The transmission line 652A and 652B are connection with the terminal body 610 through the connection portions 601a of the first frame 601. The transmission lines 652A and 652B may be feeding lines for feeding the antenna radiators (170A and 170B in FIG. 1) installed within the band 650 to the terminal body 610.

Metallic ground extending portions 674 may be disposed at one side of the transmission lines 652A and 652B to extend ground of the first frame 610 when the connection portion 601a and the band 650 are fastened by means of the screws 618.

The ground extending portions 674 may be formed to automatically contact through the fastening screw 618, thus improving radio performance of the antenna radiators (170A and 170B in FIG. 1) installed in the band 650.

The second and third frames 602 and 603 may be configured to form the front and side external appearance of the terminal body 610. IN particular, the slope faces 602a, 602b, 603a and 603b are configured to form the second mounting portion (112 in FIG. 1) and the third mounting portion (113 in FIG. 1). A manipulation portion 630 for an input and output and a speaker 640 (also shown as item 740 in FIG. 8) are exposed on the slope faces 602a, 602b, 603a and 603b.

The second and third frames 602 and 603 may be formed by injection-molding a synthetic resin or may be made of a metallic material, e.g., stainless steel (STS) or titanium (Ti).

A window 604, a display unit 620, a first circuitry supporting substrate 616 (also shown as item 716 in FIG. 8), a battery 615 (also shown as item 715 in FIG. 8), a second circuitry supporting substrate 634 (also shown as item 734 in FIG. 8), the manipulation portion 630, a third circuitry supporting substrate 641 (also shown as item 741 in FIG. 8), the speaker 650, and the like, are installed at an external or internal space of the frames 601, 602, and 603. The first, second, and third circuitry supporting substrates 616, 634, and 641 may be in the form of printed circuit boards.

The display unit 620 may have a size substantially for forming the first mounting part (111 in FIG. 1) of the terminal body 610. The display unit 620 is disposed at an inner side of the transmissive window 604 and may be a Liquid Crystal Display (LCD) module for visually expressing information, an Organic Light Emitting Diodes (OLED) module, an e-Paper, and the like. A touch recognition unit may be provided between the display unit 620 and the window 604 to allow inputting of information by the user's touch.

The battery 615 may be formed to be chargeable and configured to be installed within the terminal body 610. The battery 615 is provided with external power via the charging terminals (262 in FIGS. 2A and 362 in FIG. 3B) as described above, and supplies power required for various components.

Various components allowing mobile communication and input and output are mounted on the first circuitry supporting substrate 616. The manipulation portion 630 and the second circuitry supporting substrate 634 may be combined into an assembly of a module type. The speaker 640 is supported by the third circuitry supporting substrate 651. The second circuitry supporting substrate 634 and the third circuitry supporting substrate 641 may be connected with the first circuitry supporting substrate 616 by a connection line or an FPCB (Flexible Printed Circuit Board). The transmission lines 652A and 652B drawn out of the band 650 are connected with the second circuitry supporting substrate 634 and the third circuitry supporting substrate 651 after passing through the connection portions 601a of the first frame 601, respectively.

First sealing portions may be provided at the band 650 and the first frame 601 of the terminal body 610 to seal a gap between the terminal body 610 and the band 650. The first sealing portions are formed at the first and second frames 601 and 602 of the terminal body 610 ad may include skirt portions 609 to cover edges 650a of the end portion of the band 650.

The skirt portions 609 are formed at both ends of the terminal body 610 connected with the band 650 such that they overlap with the band 650 in a lengthwise direction to cover the edges 650a of the end portions of the band 650.

The edges 650a of the band 650 may be formed to be chamfered, and contact portions of the skirt portions 609 with the band 650 may be formed to be slope to surface-contact with the edges 650a.

Accordingly, when the band 650 is fastened to the first frame 601 and a corporate body of the second and third frames 602 and 603 is fastened to the first frame 601, the edges 650a of the end portion of the band 650 can be tightly attached to the slope portions of the skirt portions 609, implementing waterproof or dustproof characteristics.

The second and third frames 602 and 603 may be mutually bonded to support the internal components including the display unit 620. The corporate body of the second and third frame 602 and 603 is fastened to the first frame by screws.

A through hole 638 is formed between the second and third frames 603, through which the manipulation portion 630 rotatable in multiple directions is exposed.

In order to prevent infiltration of moisture into the terminal body 610 through the through hole 638, a second sealing portion 635 is formed to seal a gap between the through hole 638 and the manipulation portion 630. The second sealing portion 635 may be made of urethane or a silicon resin and formed along edges of the manipulation portion 630. The second sealing portion 635 may be fabricated to be injection-molded (dual injection molding) in conjunction with a reinforcing member 636 (also shown as item 736 in FIG. 8) made of a stronger material.

A gap between the first and second frames 601 and 602 is hermetically sealed by a third sealing portion 608. The third sealing portion 608 may be linearly formed between a gap when the first and second frames 601 and 602 are assembled.

Figure 9A:
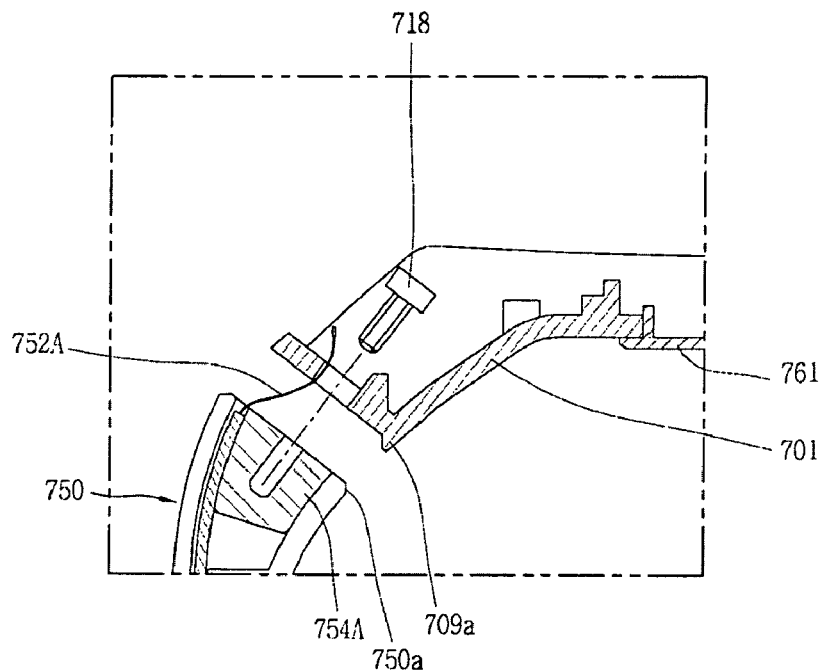
FIGS. 9A to 9C are sectional views showing an assembling process of a waterproof method of first and second sealing portions of the mobile terminal in FIG. 8.
Figure 9B:
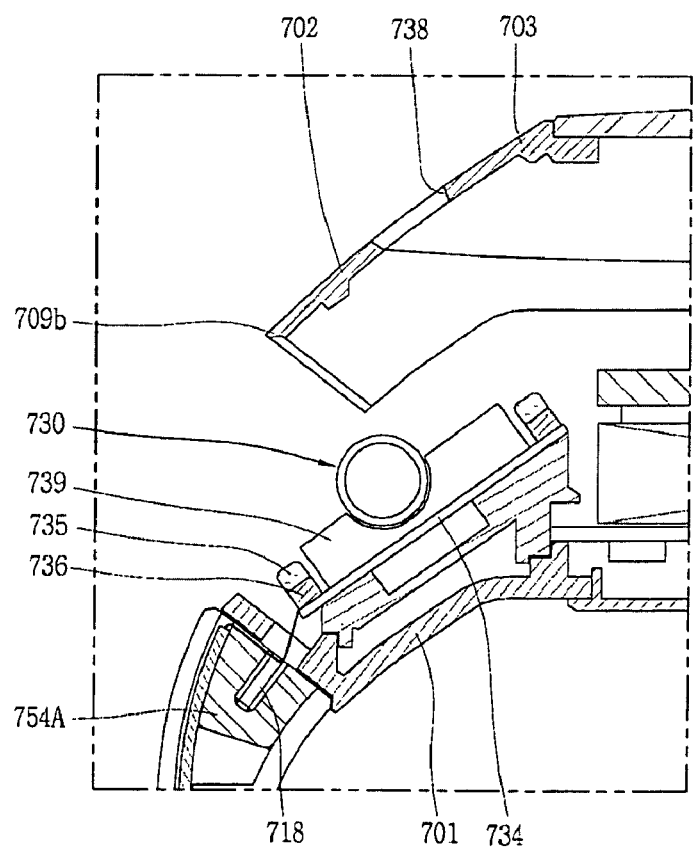
Figure 9C:
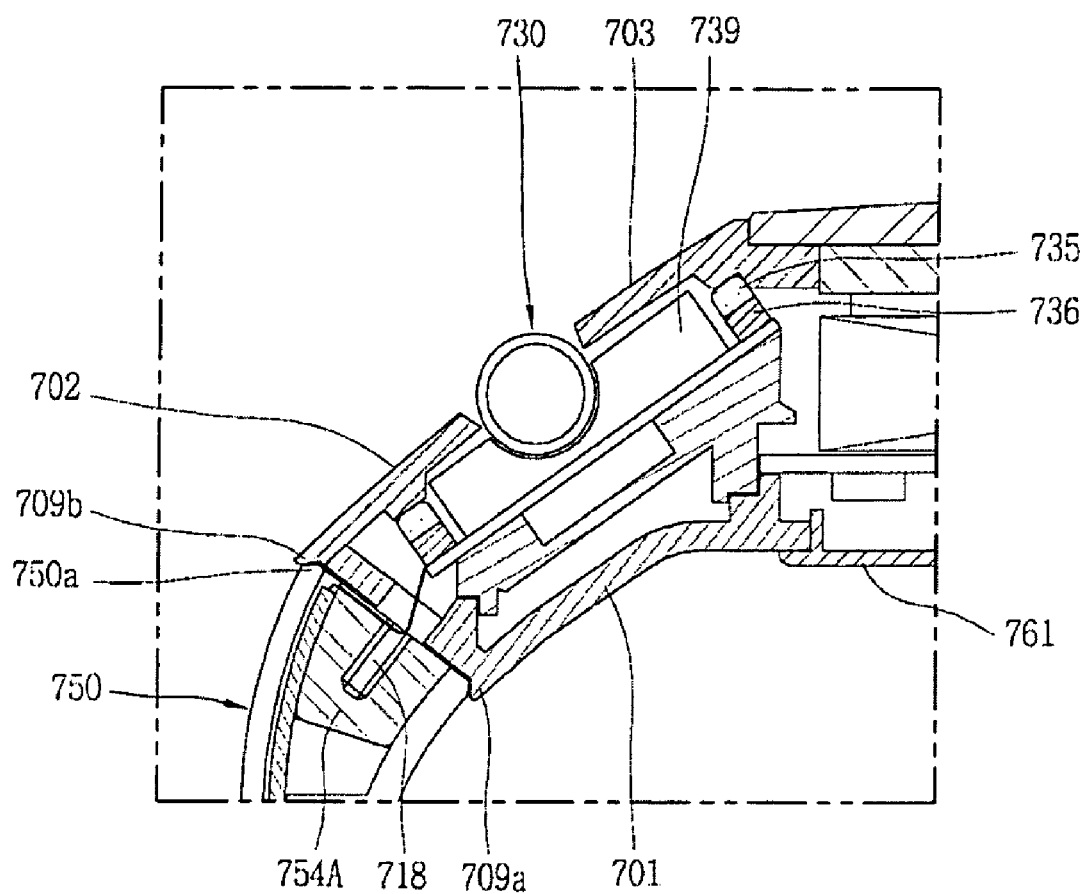

FIG. 8 is a sectional view of a mobile terminal according to an exemplary embodiment of the present invention, and FIGS. 9A to 9C are sectional views showing an assembling process of a waterproof method of the first and second sealing portions of the mobile terminal in FIG. 8. A mobile terminal 700 in the present embodiment may include the entirety or a portion of the characteristics of the mobile terminals described with reference to FIGS. 1 to 7 and similar reference numerals are given to the corresponding elements.

As shown in FIG. 8, an external surface of a window 704 forming the first mounting part (111 in FIG. 1) may have a curved surface to be in harmony with the configuration of the external appearance of the mobile terminal 700. In order to reduce scattered reflection, the window 704 may employ gapless tempered glass.

A band 750 includes base members 757 having receiving recesses 756 for receiving antenna radiators 770A and 770B, fastening portions 754A and 754B having screw holes for being fastened by screws 718 to a terminal body 710, and band covers 755A and 755B for opening and closing the receiving holes 756. The band includes a fastener (e.g., buckle) 751.

Spacers 759 may be formed at the band covers 755A and 755B in order to separate the antenna radiators 770A and 770B from an inner surface of the band 750. Accordingly, the antenna radiators 770A and 770B can be sufficiently separated from the users body such as the user's wrist.

The antenna radiators 770A and 770B refer to a first antenna radiator 770A for mobile communication and a second antenna radiator 770B for a short range communication. The first and second antenna radiators 770A and 770B may be disposed in the mutually opposite sides based on the terminal body 710. The antenna radiators 770A and 770B may be installed to be parallel in the band 750, so that they may not be less affected by the human body (user) or the exterior.

The first antenna radiator 770A may be a corresponding length and pattern to have a band, such as CDMA, GSM, and the like, for transmission and reception with a base station or other users while on the move, and the second antenna radiator 770B may have a length and pattern for communicating with a wireless ear set or a nearby server device by Bluetooth™.

By having the first antenna radiator 770A for radio mobile communication and the second antenna radiator 770B for short range communication, a good external appearance can be implemented compared with the related art in which the antenna radiator is protruded or exposed from a terminal body. Because the capacity of the antenna radiators 770A and 770B is reduced, the size of the mobile terminal can be also reduced accordingly.

As shown in FIG. 9A, an end portion of the band 750 contacts with a first frame 701 and fastened by a screw 718. The first frame 701 includes a skirt portion 709, including lips 709a and 709b, is formed to cover an edge 750a of the end portion of the band 750. Accordingly, when the band 750 is fastened to the first frame 701 of the terminal body 710 in a lengthwise direction, the edge 750a of the end portion of the band 750 can be compressed to the first skirt portion 709a, hermetically sealing the band 750 and the first frame 701.

As shown in FIG. 9B, a corporate body of the second and third frames 702 and 703 is assembled to the first frame 701. When the assembly of the second and third frames 702 and 703 is disposed such that a manipulation portion 730 is exposed through a through hole 738 between the second and third frames 702 and 703, the assembly is fastened to the first frame 701 by a screw (not shown). In this process, second sealing portions 735 formed at edge portions of the manipulation portion 730 are pressed onto inner surfaces of the second and third frames 702 and 703, hermetically sealing a gap between the manipulation portion 730 and the second and third frames 702 and 703. Manipulation portion 730 rests within a platform 739.

Figure 10A:
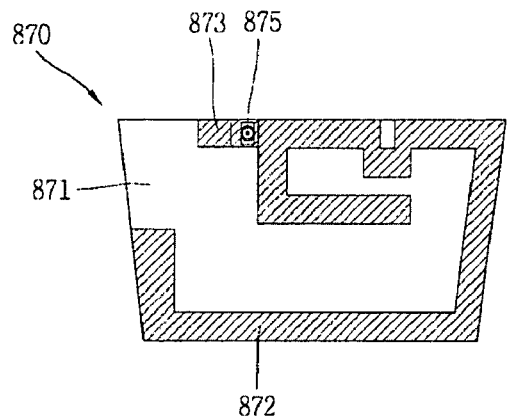
FIGS. 10A to 10C are plan views showing the structure of an antenna radiator installed in a band according to an exemplary embodiment of the present invention.
Figure 10B:
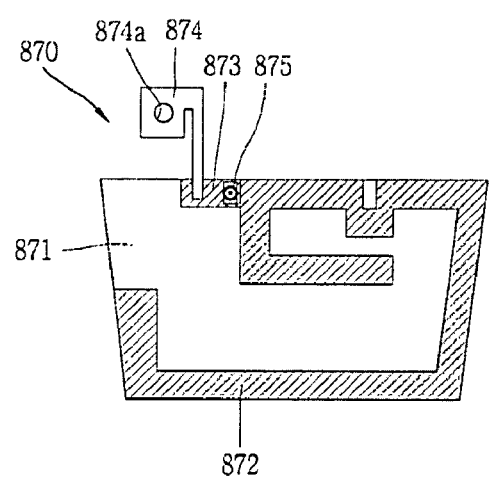
Figure 10C:
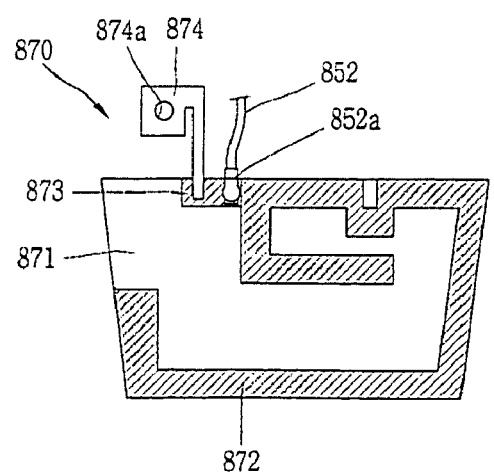

FIGS. 10A to 10C are plan views showing the structure of the antenna radiator installed in the band according to an exemplary embodiment of the present invention.

Specifically, FIG. 10A shows a configuration where a feeder 852 for feeding electromagnetic signal to a terminal body (Reception mode; Rx) or vise versa (Transmission mode; Tx) and a ground extending portion 874 are not connected. As shown in FIG. 10A, the antenna radiator 870 may include an insulation layer 871 in the form of a film and a conductive pattern 872 formed on the insulation layer 871. For example, the antenna radiator 870 may be formed as a FPCB.

A stub 873 shorter than the conductive pattern 872 may be formed at the opposite side of the conductive pattern 872. The stub 873 may be connected with the ground extending portion 874 to improve the performance of the antenna radiator 870 as described below.

A connector 875 is provided between the stub 873 and the conductive pattern 872 to detach or attach the feeder 852. The feeder 852 may be formed as a coaxial cable and the connector 875 is formed coaxially.

FIG. 10B shows a configuration where the ground extending portion 874 is connected to the antenna radiator 870. As shown in FIG. 10B, the ground extending portion 874 may be made of a flexible metallic material and includes a screw hole 874a such that one end thereof is connected with the antenna radiator 870 and the other end comes in contact with the first frame (refer to the description about 601 and 601a in FIG. 7) by means of a screw.

Accordingly, because the band includes the antenna radiator 870, a problem such as degradation of radio performance that may arise when the antenna radiator 870 is located away from the ground of the terminal body can be effectively overcome.

FIG. 10C shows a configuration where the ground extending portion 874 and the feeder 852 are connected with the antenna radiator 870. As shown in FIG. 10C, the connector 875 is connected by the opposite connector 852a formed at an end portion of the feeder 852 to transmit a signal received from the antenna radiator 870 to the terminal body or radiates a radio signal received from the terminal body into the air.

In particular, the antenna radiator 870 may be connected with the ground extending portion 874 to form a sort of planar inverted F antenna (PIFA). Such structure and disposition of the antenna radiator 870 can effectively prevent possible degradation of performance of the antenna radiator 870 as the antenna radiator 870 is disposed to be close to the human body.

Figure 11:
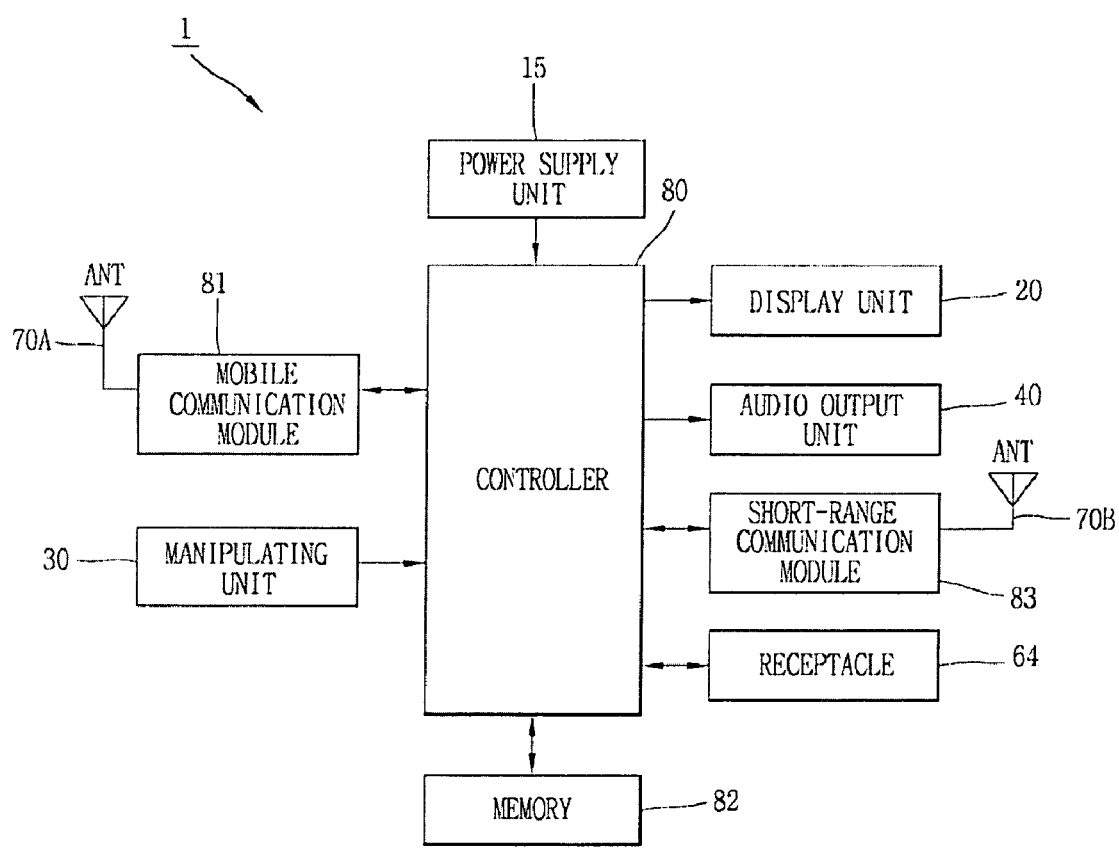
FIG. 11 is a block diagram of the mobile terminal according to the exemplary embodiment of the present invention.

FIG. 11 is a block diagram of the mobile terminal according to another exemplary embodiment of the present invention.

As shown, the mobile terminal may include a mobile communication module 81, a manipulation unit 30, a display unit 20, an audio output unit 40, a memory 82, a short-range communication module 83, a power supply unit 15, and a controller 80.

The controller 80 typically controls the general operations of the mobile terminal. For example, the controller 180 performs the controlling and processing associated with voice calls, data communications, video calls, and the like, through the mobile communication module 81. In addition, the controller 80 may wirelessly communicate with an ear set or a home appliance through the short-range communication module 83.

In addition, the controller 80 may receive a change in a signal of the detector pins 464*b* in FIG. 4B and control a transfer to the UIM/SIM mode or the data communication mode as shown in FIG. 6 accordingly. In the absence of the detector pin, the controller may control software such that the mobile terminal is changed to the UIM/SIM mode when the UIM/SIM card is inserted, and the mobile terminal is changed to the data communication mode when the plug is inserted.

The mobile communication module 81 may transmit/receive radio signals to/from a network (e.g., mobile communication base station) via the first antenna radiator 70A. For example, the mobile communication module 81 may include a transmitting unit that handles the transmission and reception of audio data, text data, image data and control data, modulates transmission signals and transmits the modulated signal, and a receiving unit that demodulates received signals under the control of the controller 80.

The short-range communication module 83 may communicate with an external device such as the ear set or the home appliance via the second antenna radiator 70B.

The manipulation unit 30 may provide key input data inputted to control an operation of the terminal by the user to the controller 80. A wheel and a push key constituting the manipulation unit 30 may be configured as shown in FIG. 1. Accordingly, a desired menu or function can be quickly accessed through a forward rotation or backward rotation of the wheel. A corresponding function can be executed by pressing the wheel, and a movement to a different direction from a direction indicated by the wheel can be executed by the push key. For example, in order to input characters or numbers, the mobile terminal arranges numbers or alphabets on the display unit 20. The arranged numbers or alphabets may be specified by manipulating the wheel or the push key by the user and outputted as a phone number of a sentence on the display unit 20.

The display unit 20 may display and output information processed in the mobile terminal. The display unit 20 may output numbers, characters, still images, videos according to various modes of the mobile terminal. For example, the display unit 20 may be set such that when the mobile terminal is in a mode for making a phone call, the display unit 20 displays inputted numbers, when the mobile terminal is in a message transmission mode, the display unit 20 displays inputted characters or numbers or a menu for searching a function, and when the mobile terminal is in a standby mode, the display unit 20 displays time. In a different point of view, for example, when the mobile terminal is in the phone call mode, the display unit 20 may display a User Interface (UI) or a Graphic User Interface (GUI) associated with a call or other communication under the control of the controller 80. When the mobile terminal is in the video call mode or the image capturing mode, the display unit 20 may display a captured image and/or received image, a UI, a GUI, and the like, under the control of the controller 80. The display unit may be also used as an input device as well as an output device by including a touch screen.

In addition, the display unit 20 may display and output the UI or the GUI to inform the user or receive an instruction regarding a state that a card is inserted or a plug is inserted in a different form.

The audio output unit 40 may convert audio data received from the mobile communication module 81 or stored in the memory 82 and output the converted data in a call signal reception mode, a phone call mode, a recording mode, a voice recognition mode, and the like, under the control of the controller 80.

Also, the audio output module 40 may provide audible outputs related to a particular function (e.g., a call signal reception sound, a message reception sound, etc.) performed by the mobile terminal. The audio output module 40 may include a speaker, a receiver, a buzzer, or the like.

The memory 82 may store programs or the like used for the processing and controlling performed by the controller 80, or may temporarily store inputted/outputted data (e.g., a phone-book, messages, still images, video, etc.). The memory 82 may include at least one type of storage medium including a hard disk type, a card-type memory (e.g., SD or XD memory, etc), a flash memory, a Random Access Memory (RAM), a Read-Only Memory (ROM), and the like.

Besides, the mobile terminal may include a broadcast receiving module that may receive a broadcast signal transmitted through a satellite or terrestrial means, convert the same into a broadcast data format that can be outputted to the audio output unit 40 and the display unit 20, and output the converted data to the controller 80. In addition, the broadcast receiving module may receive supplementary data associated to a broadcast (e.g., Electronic Program Guide (EPG), a channel list, etc.). The broadcast data and supplementary data converted by the broadcast receiving module 86 may be stored in the memory 84.

The mobile terminal may include an external interface that may receive data or power from an external device and transfer the same to respective elements within the mobile terminal, or transfer internal data of the mobile terminal to the external device. The external interface may be configured to be connected with a key board that can perform an inputting operation from the exterior. The external interface may be implemented as one of a connection port (terminal) for connecting an earphone to the mobile terminal via a fixed or wireless means, a port for short-range communications (e.g., an Infrared Data Association (IrDA) port, a Bluetooth™ port, a wireless LAN port, etc.).

The power supply unit 15 may supply power required for operating each element upon receiving external power or internal power under the control of the controller 80. The power supply unit 15 may be provided to be installed within the terminal body or may be provided with power from an external source through a charging terminal (262 in FIG. 3) and store it.

As the exemplary embodiments may be implemented in several forms without departing from the characteristics thereof, it should also be understood that the above-described exemplary embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal configured to be mounted on a user's wrist or forearm, comprising:
 a terminal body including a controller, a wireless communication device, and a display unit, and having a frame which includes first and second connection portions;
 first and second bands connected to the first and second connection portions, respectively; and
 first and second antenna radiators installed in the first and second bands, respectively,
 wherein the first band comprises a ground extending portion configured to extend a ground of the frame.

2. The mobile terminal of claim 1, wherein each of the first and second antenna radiators comprises:
 a film type insulation layer; and
 a conductive pattern formed on the insulation layer.

3. The mobile terminal of claim 2, further comprising:
 first and second feeding lines arranged to respectively connect the first and second antenna radiators to the terminal body, and formed to pass through respective end portions of the first and second bands and extend into the frame.

4. The mobile terminal of claim 3, wherein the first feeding line comprises:
 a coaxial cable.

5. The mobile terminal of claim 3, wherein the first antenna radiator comprises:
 a stub formed on a side of the first antenna radiator opposite to a side of the conductive pattern of the first antenna radiator.

6. The mobile terminal of claim 5, wherein the ground extending portion is connected with the stub.

7. The mobile terminal of claim 6, further comprising:
 a connector provided between the stub and the conductive pattern of the first antenna radiator and configured to attach and detach the first feeding line.

8. The mobile terminal of claim 1, further comprising:
 screws arranged to connect the first and second connection portions of the frame to respective ends of the first and second bands.

9. The mobile terminal of claim 1, wherein the ground extending portion is formed of a metal, and has one end connected with the first antenna radiator and another end contacting the frame through a screw fastening.

10. The mobile terminal of claim 1, further comprising:
 a band cover; and
 a receiving recess configured to receive the first antenna radiator and formed on an inner side of one of the first and second bands, the receiving recess covered by the band cover.

11. The mobile terminal of claim 10, wherein the band cover comprises:
 a spacer configured to separate the first antenna radiator from an inner surface of one of the first and second bands.

12. The mobile terminal of claim 1, wherein the second antenna radiator has a length and pattern configured for wireless communication with a radio ear set worn by the user.

13. A mobile terminal configured to be mounted on a user's wrist or forearm, comprising:
 a terminal body including a controller, a wireless communication device, and a display unit, and having a frame which includes first and second connection portions;
 first and second bands connected to the first and second connection portions, respectively;
 first and second antenna radiators installed in the first and second bands, respectively; and
 screws arranged to connect the first and second connection portions to the respective ends of the first and second bands,
 wherein at least one of the first and second bands comprises a ground extending portion configured to extend a ground of the frame.

14. A mobile terminal configured to be mounted on a user's wrist or forearm, comprising:
 a terminal body including a controller, a wireless communication device, and a display unit, and having a frame which includes first and second connection portions;
 first and second bands connected to the first and second connection portions, respectively;
 first and second antenna radiators installed in the first and second bands, respectively; and
 first and second feeding lines arranged to respectively connect the first and second antenna radiators to the terminal body, and formed to pass through the respective end portions of the first and second bands and extend into the frame,
 wherein at least one of the first and second feeding lines is formed as a coaxial cable.

* * * * *